(12) United States Patent
Christel et al.

(10) Patent No.: US 8,389,667 B2
(45) Date of Patent: Mar. 5, 2013

(54) PARTIALLY CRYSTALLINE POLYETHYLENETEREPHTHALATE

(75) Inventors: Andreas Christel, Zuzwil (CH); Brent Allan Culbert, Wil (CH); Theodor Jürgens, Casstrop-Rauxel (DE)

(73) Assignee: Buhler AG, Uzwil (CH)

( * ) Notice: Subject to any disclaimer, the term of this patent is extended or adjusted under 35 U.S.C. 154(b) by 496 days.

(21) Appl. No.: 11/596,651

(22) PCT Filed: Jan. 24, 2005

(86) PCT No.: PCT/CH2005/000036
§ 371 (c)(1),
(2), (4) Date: Mar. 16, 2007

(87) PCT Pub. No.: WO2005/090437
PCT Pub. Date: Sep. 29, 2005

(65) Prior Publication Data
US 2007/0225471 A1    Sep. 27, 2007

(30) Foreign Application Priority Data
Mar. 23, 2004 (DE) .......................... 10 2004 014 590

(51) Int. Cl.
*C08G 63/00* (2006.01)
(52) U.S. Cl. ...................... 528/308.1; 528/271; 528/272; 528/301; 528/308.2; 528/308.3; 528/308.6; 528/308.7; 528/308.8
(58) Field of Classification Search .................. 528/271, 528/272, 301, 308, 308.8, 308.3, 308.1, 308.6, 528/308.7, 308.2
See application file for complete search history.

(56) References Cited

U.S. PATENT DOCUMENTS
5,830,982 A * 11/1998 Stouffer et al. ............ 528/308.3
2001/0034431 A1 * 10/2001 Schiavone ................ 528/308.8

FOREIGN PATENT DOCUMENTS
| EP | 0 465 040 | 1/1992 |
| EP | 0 532 988 | 3/1993 |
| WO | WO 99/61505 | 12/1999 |
| WO | WO 01/42334 | 6/2001 |

OTHER PUBLICATIONS

"Modern Polyesters: Chemistry and Technology of Polyesters and Copolyesters", 2003, John Wiley and Sons, Ltd, pp. 280-281.*

(Continued)

*Primary Examiner* — Frances Tischler
(74) *Attorney, Agent, or Firm* — Francis C. Hand; Carella, Byrne, et al

(57) ABSTRACT

The invention relates to a partially crystalline polyethylene terephthalate having a degree of polymerization which is greater than 80, particularly greater than 100, produced from a diol component and a dicarboxylic acid component, wherein according to the invention the DSC melting point, when measured with a heating rate of 10° C./Min during the first passage and second passage, is less than the melting temperature (Tm) of a comparable standard polyethylene terephthalate which is dependent upon the comonomer content. The inventive method for the production of a polyethylene terephthalate comprises a step for the production of a polycondensate prepolymer melt; a step for the formation of granules and the solidification of the polycondensate prepolymer melt; a step for increasing the degree of crystallization of the prepolymer granulates and a step for increasing the molecular weight of the granulates by means of solid phase polycondensation, wherein according to the invention a treatment temperature of 220° C. in step d) is not exceeded.

11 Claims, 12 Drawing Sheets

OTHER PUBLICATIONS

Karayannidis, G. P. et al: "Solid-State Polycondensation of Poly(Ethylene Terephthalate) Recycled from Postconsumer Soft-Drink Bottles. I." Dec. 20, 1993.

Journal of Applied Polymer Science, John Wiley & Sons, NY, pp. 2135-2142.

* cited by examiner

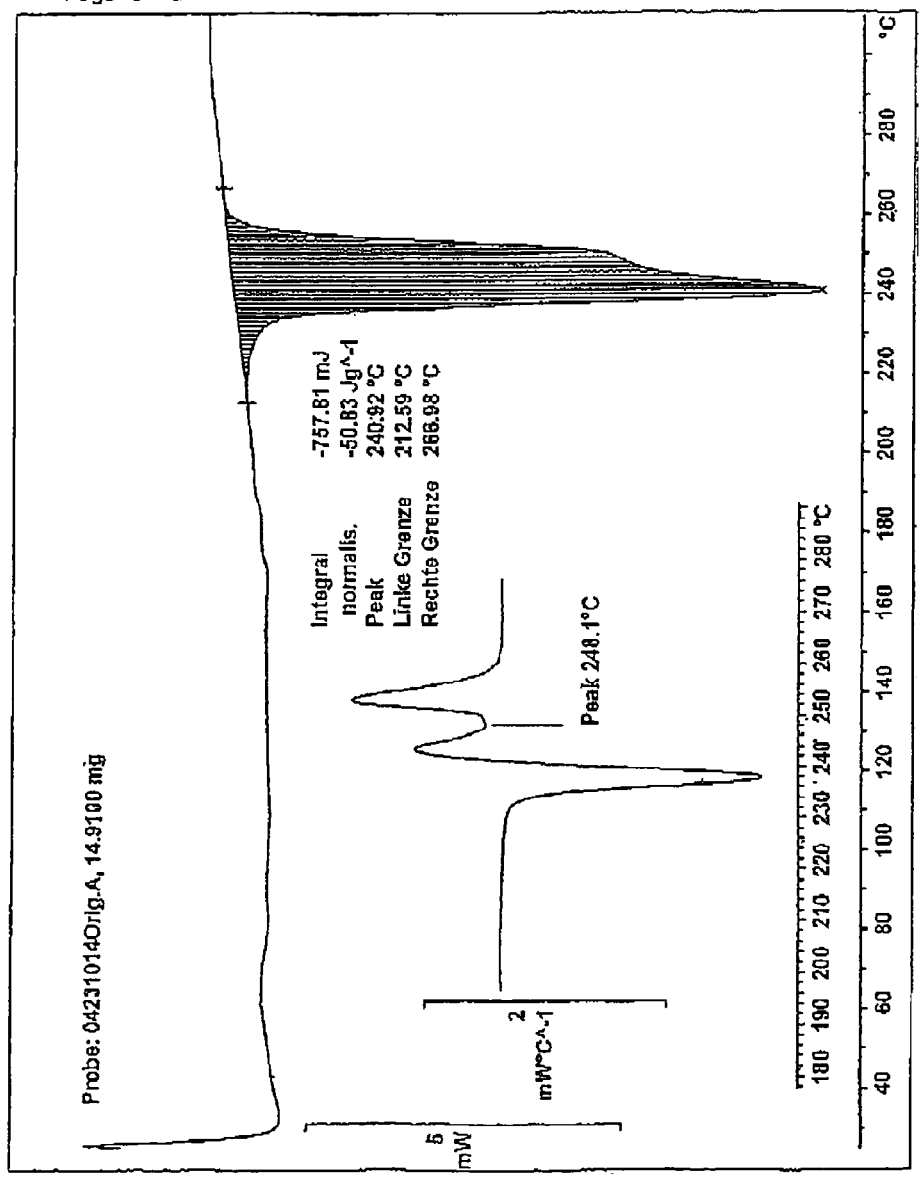

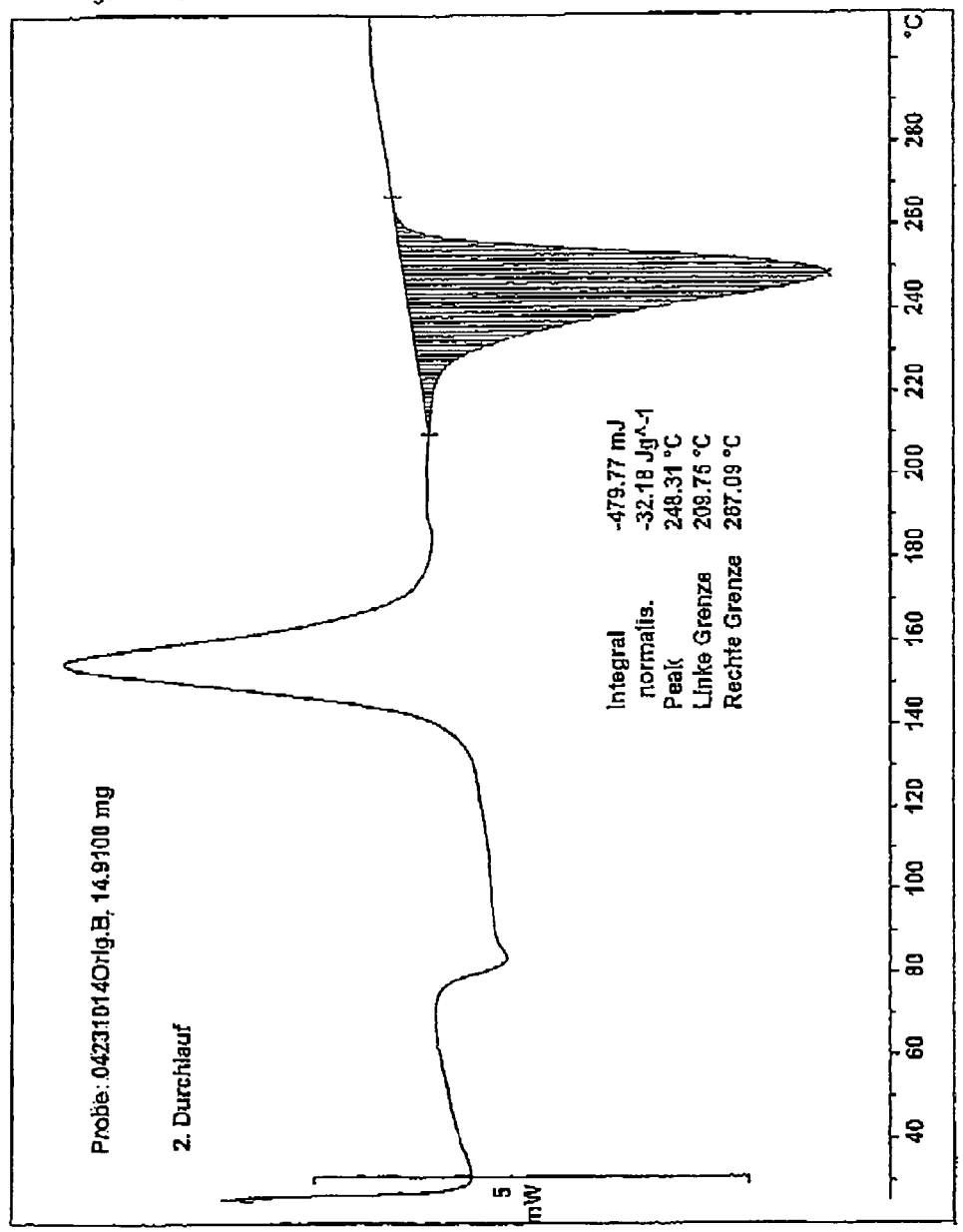

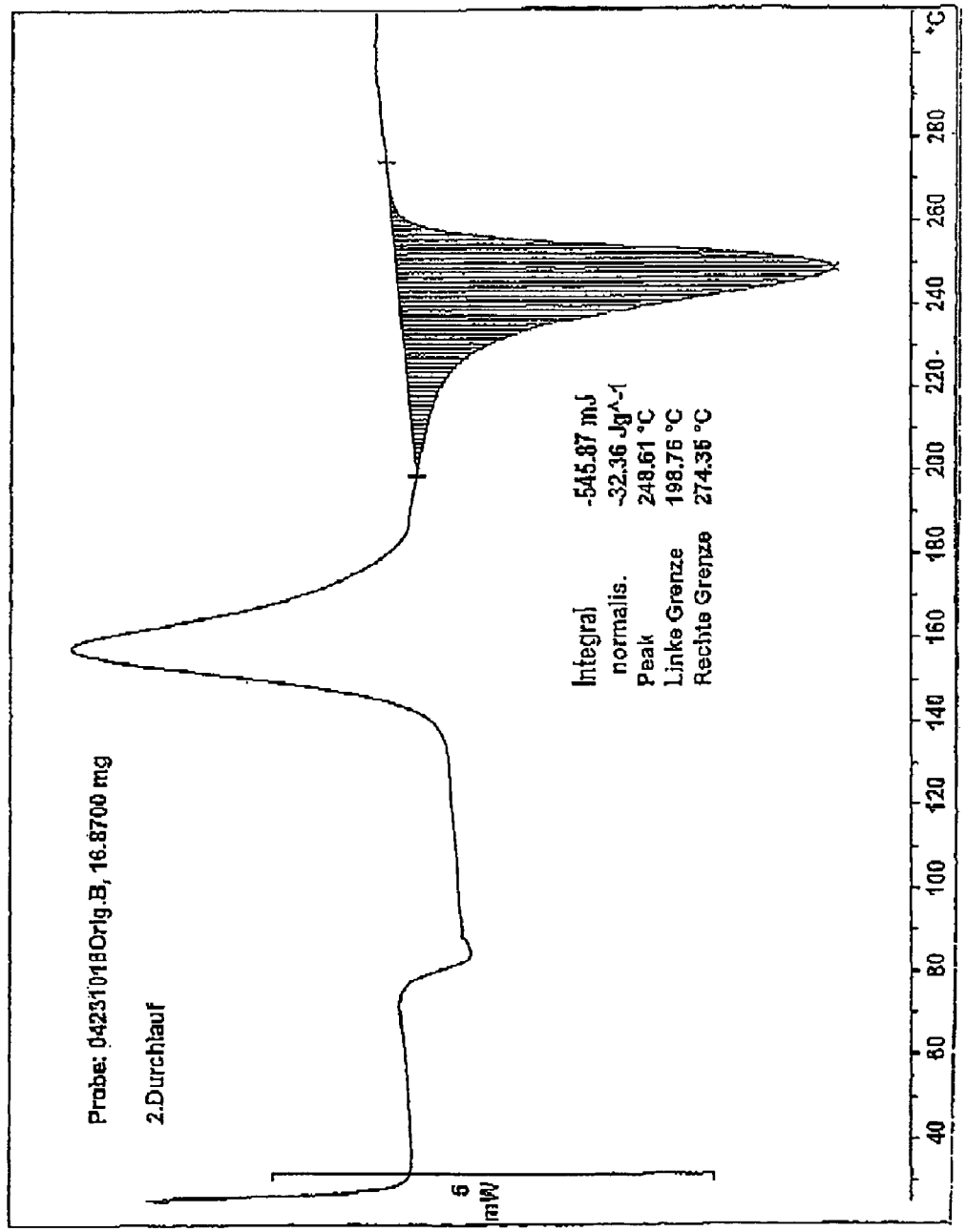

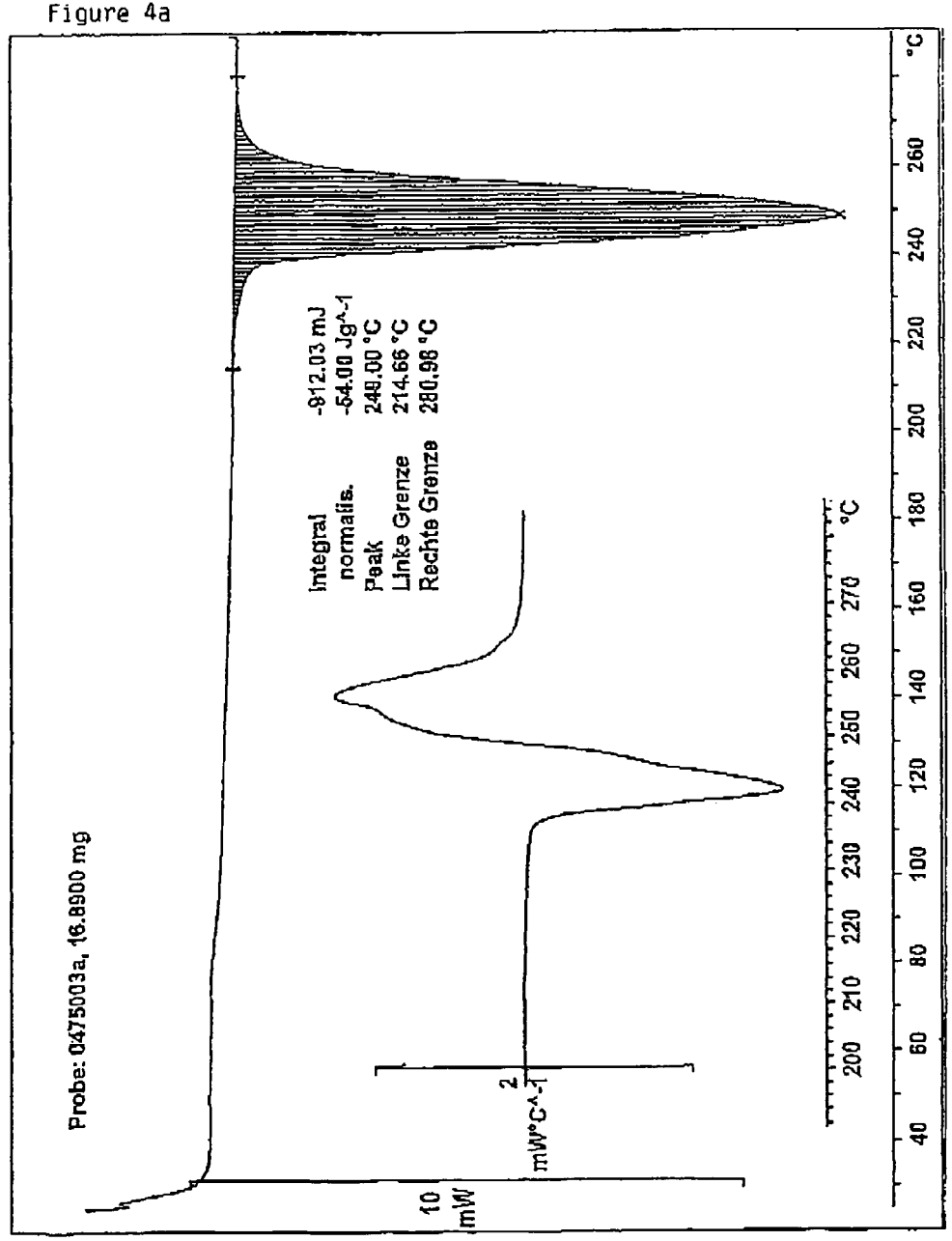

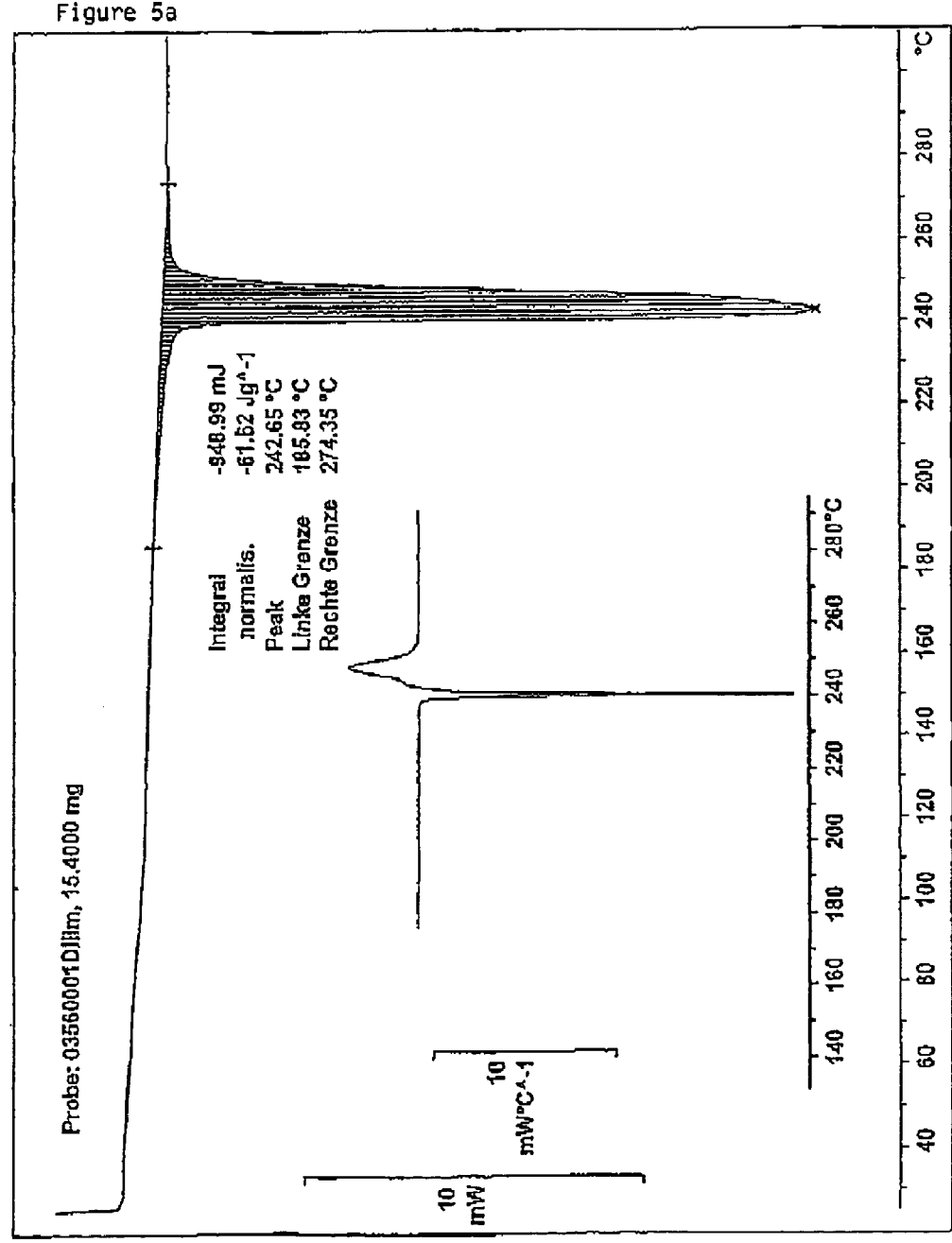

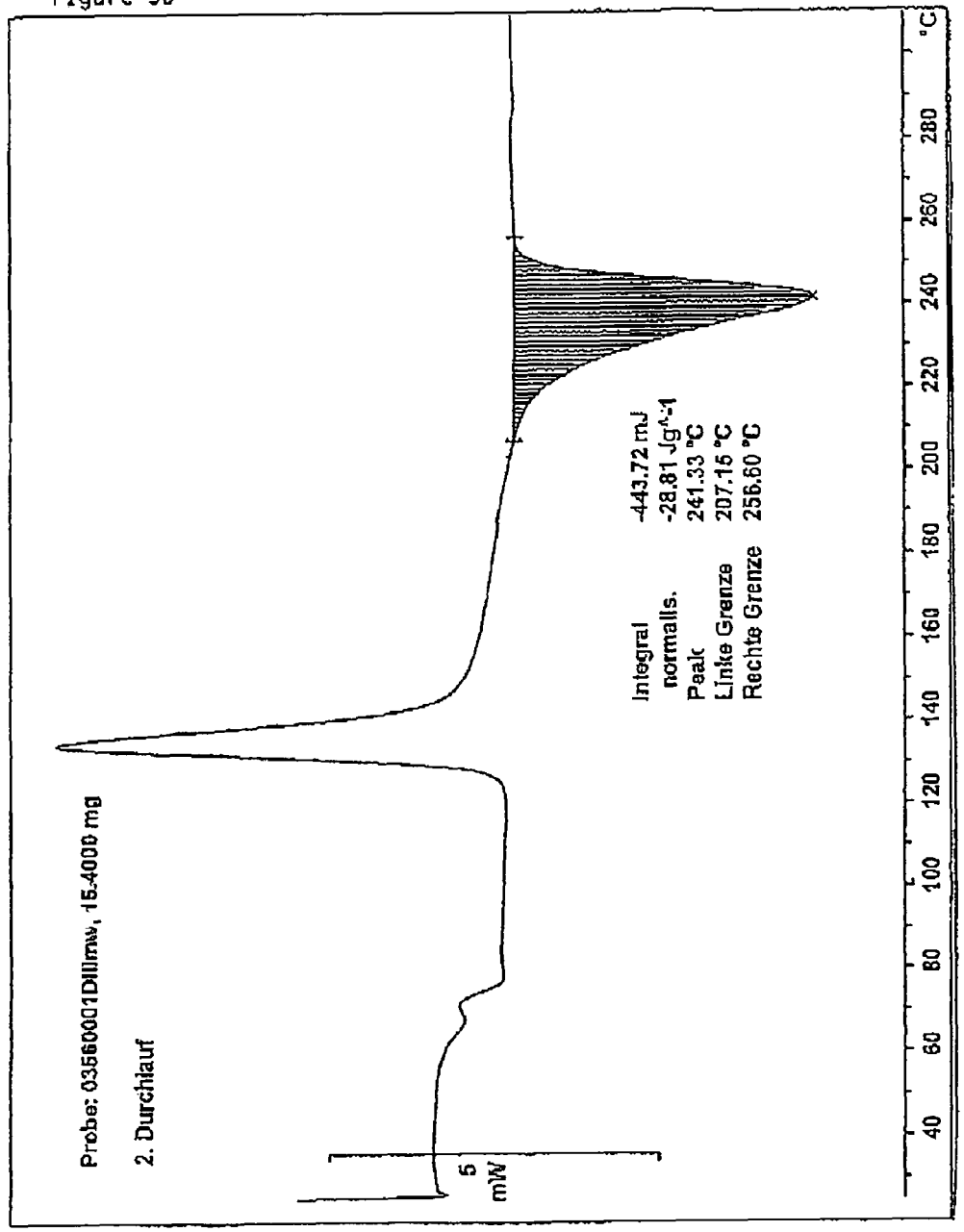

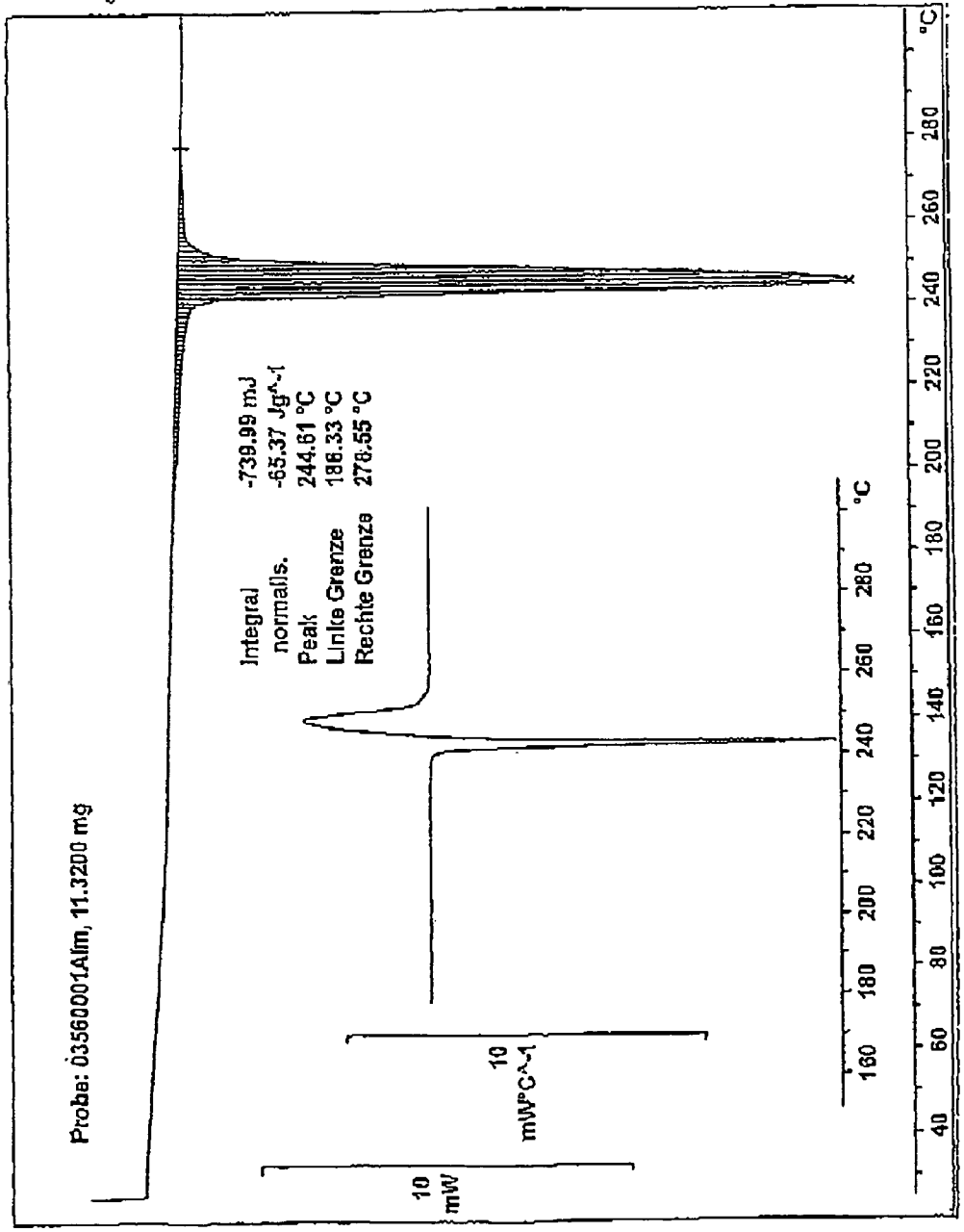

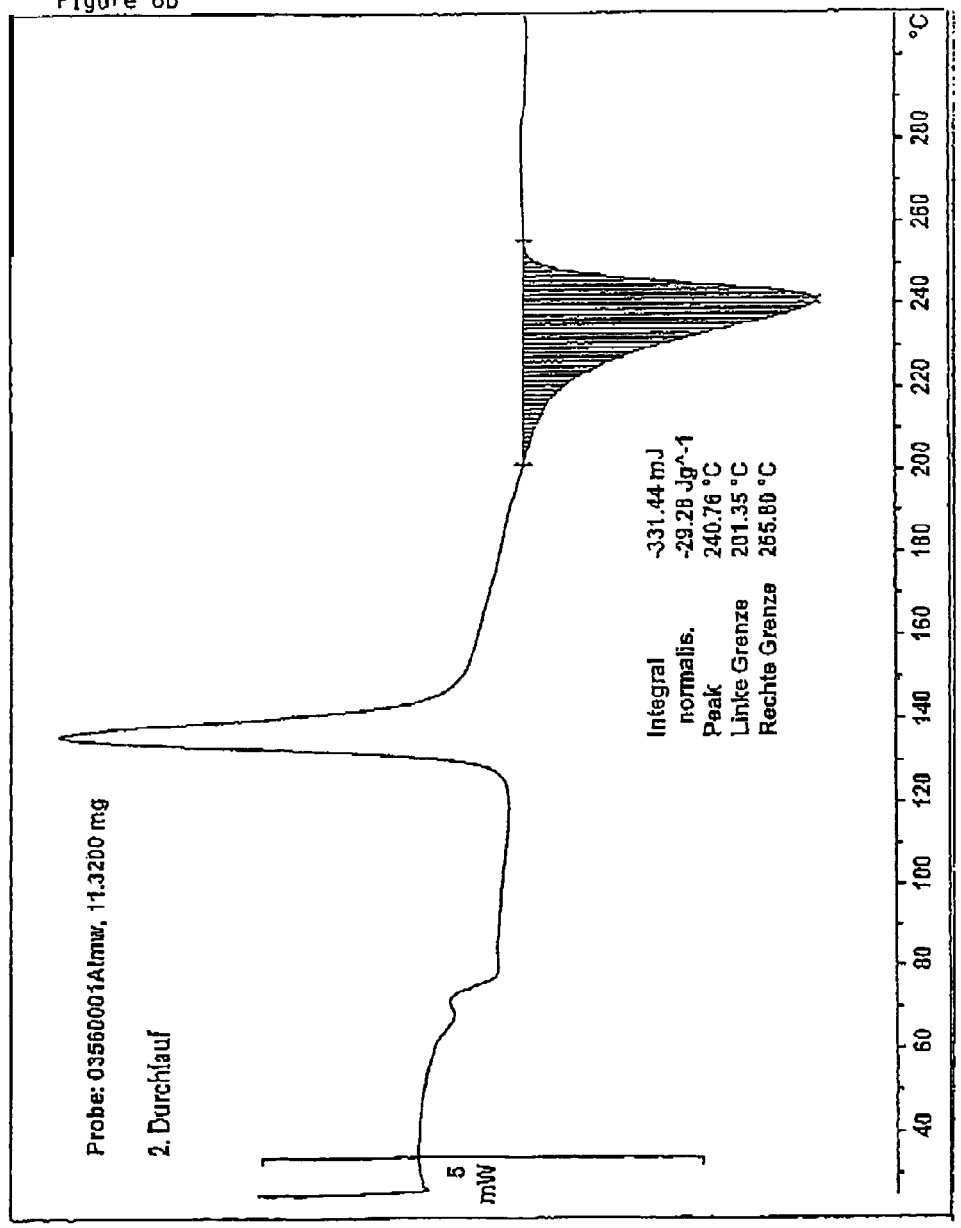

PARTIALLY CRYSTALLINE POLYETHYLENETEREPHTHALATE

The invention relates to a partially crystalline polyethyleneterephthalate with a degree of polymerization larger than 80, especially greater than 100 which is produced from a diol component and a dicarboxylic acid component.

The invention additionally relates to method for manufacturing a polyethyleneterephthalate, especially of the polyethyleneterephthalate indicated, having the following steps: manufacture of a polycondensate prepolymer melt; forming of granulates and solidification of the polycondensate prepolymer melt; raising the degree of crystallization of the prepolymer granulates; and raising the molecular weight of the granulates by means of solid phase polycondensation.

STATE OF THE ART

Polyethyleneterephthalates are used e.g. for the manufacture of films, bottles, bowls, beakers, bands, tiling, yarns and threads, in bulk or foamed form.

Methods for the manufacture of commercially utilizable polyethyleneterephthalates which must be melted for the subsequent processing, are sufficiently known and described e.g. by means of U.S. Pat. No. 4,161,578 (Herron). The polyethyleneterephthalates so obtained have however a relatively high melting point and unfavorable melting properties.

It is known likewise to manufacture polyethyleneterephthalates having improved melting properties through addition of increased amounts of comonomers. This connection is described e.g. in EP 532 988. In that connection there is the disadvantage that the mechanical properties and the crystallization properties are also influenced, which for many applications has a negative effect. Additionally the price of many comonomers is significantly higher than the price of the basic monomers.

THE INVENTION

It is a problem of the present invention to make available a partially crystalline polyethyleneterephthalate that is distinguished by improved melting and processing properties without the disadvantages mentioned above.

It is a further problem of the present invention to provide a granulate from polyethyleneterephthalate that is distinguished through improved melting and processing properties without the disadvantages mentioned above.

These problems are thereby solved in accordance with claim 1, that a partially crystalline polyethyleneterephthalate with a degree of polymerization greater than 60, specially greater than 100, manufactured from a diol component and a dicarboxylic acid component is made available whose DSC melting point, measured at a heating rate of 10° C./min in the first run-through and in the second run-through, lies below a comonomer content dependent melting temperature (Tm) of a comparable standard polyethyleneterephthalate.

The polyethyleneterephthalate in accordance with the invention is manufactured by means of a liquid phase polymerization and a solid phase polymerization stage, wherein between the two stages a particle manufacturing step takes place.

The polyethyleneterephthalate in accordance with the invention is thereby obtained, that in the liquid phase polymerization step the addition of additives, which lower the activation energy of the esterification reaction are limited to a minimum and that in the solid phase polymerization step the parameters initial viscosity, particle size, treatment temperature, treatment gas composition and treatment time are chosen such that an excessive increase of the enthalpy of melting is prevented.

Preferably the relationship $Tm=T0-2.5°$ C.*% comonomer content (in mol %) is valid for the melt temperature and T0 is less than or equal to 250° C., wherein the comonomer proportion of the diol component essentially comprises diethyleneglycol. It is specially advantageous if $Tm=T0-3°$ C.*% comonomer content (in mol %) is valid for the melt temperature and T0 is less than or equal to 260° C.

The comonomer proportion of the diol component can essentially comprise diethyleneglycol.

Preferably the value of TD is less than or equal to 259° C. specially 257° C.

The polyethyleneterephthalate in accordance with the invention is preferably manufactured from a diol component which comprises up to 95 mol % to 100 mol % terephthalic acid, wherein the total content of comonomer lies between 1 and 7%.

Preferably the polyethyleneterephthalate is manufactured from a diol component, which comprises up to 97 mol % to 99% of ethyleneglycol, and a dicarboxylic acid component, which comprises up to 97 mol % to 100 mol % of terephthalic acid, wherein the total comonomer content lies between 1.5 and 5%.

Preferably the DSC melting point for the polyethyleneterephthalate in accordance with the invention in the first run-through and in second run-through under 245° C.

Furthermore, preferably the DSC melting point for the polyethyleneterephthalate in accordance with the invention is larger in the first run-through than the DSC melting point in the second run-through, wherein especially T0 in the first run-through amounts to less than or equal to 260° C. and in the second run-through less than or equal to 258° C. and preferably T0 in the first run-through amounts to less than or equal to 259° C. and T0 amounts to less than or equal to 257° C. as well as in the second run-through amounts to less than or equal to 257° C. and especially T0 amounts to less than or equal to 255° C.

With the polyethyleneterephthalate one is dealing preferably with a thermally partially crystallized polyethyleneterephthalate or with an essentially linear polyethyleneterephthalate.

Preferably the polyethyleneterephthalate has a DSC melting enthalpy in the first run-through less than 70 J/g, especially less than 65 J/g.

The polyethyleneterephthalate can be present as granulate and the average granulate size can thereby lie between 0.4 and 3 mm, preferentially between 0.7 and 2 mm and especially between 0.8 and 1.4 mm, wherein the granulate suitably comprises massive particles which have a defined shape such as e.g. cylinder-shaped, spherically-shaped, drop-shaped or ball-like.

The degree of polymerization of polyethyleneterephthalate can lie between 120 and 250, especially between 145 and 180, and comonomer content can amount to less than 3.5 mol %.

The polyethyleneterephthalate in accordance with the invention is suited for the manufacture of hollow bodies in injection molding methods especially if the degree of polymerization lies between 80 and 150, especially between 100 and 130.

The method in accordance with the invention for the manufacture of a polyethyleneterephthalate, especially the polyethyleneterephthalates described further above, comprises a step a) to manufacture a polycondensate prepolymer melt, a step b) for the formation of granulates and solidification of the polycondensate prepolymer melt, a step c) for raising of the degree of crystallization of the prepolymer granulates and a step d) for raising of the molecular weight of the granulates by means of solid phase polycondensation, wherein in accordance with the invention in the step d) a treatment temperature of 220° C. is not exceeded.

Preferably step d) comprises a partial step of heat-up under the action of a process gas, wherein the partial step of heat-up is carried out at least initially with use of a fresh or at least a partially purified process gas.

Similarly step d) can comprise a partial step of heat-up under the influence of a process gas and the partial step of the post condensation reaction can at least initially take place with use of a cleaner or at least a purified process gas.

Suitably the partial step of the post condensation reaction can take place in a tubular reactor which has at least one gas inlet in the top third of the reactor.

Preferably the method takes place continuously and the partial step of post condensation is carried out under the influence of a process gas, wherein the amount of gas to the amount of product (mg/mp) amounts to between 0.1 and 1.4 especially between 0.3 and 0.8.

Preferably the DSC melting point lies in the second run-through, measured on a granulate according to method step b), at least 2° C. under the DSC melting point in the second run-through, measured on a granulate according to method step d).

Preferably the polycondensation prepolymer melt is a low viscosity polycondensate prepolymer melt with a degree of polymerization between 10 and 50, especially between 15 and 35.

Polyethyleneterephthalate

With the polyethyleneterephthalate, one is dealing with a crystallizable thermoplastic polyester, which is produced by means of a polycondensation with splitting off of low molecular weight reaction products. The polycondensation can thereby take place directly between the monomers or via an intermediate stage, which is subsequently reacted through transesterification, wherein the transesterification can again take place accompanied by splitting off of a low molecular weight reaction product, or ring-opening polymerization. Essentially the polyester so produced is linear, wherein a small number of branches can develop.

The polyethyleneterephthalate is produced from its monomers, a diol component and a dicarboxytlic acid component. In accordance with the invention the diol components comprise more than 95 mol %, especially more than 97 mol % of ethyleneglycol (1,2 ethandiol) and the dicarboxylic acid components more than 95 mol %, especially more than 97% of terephthalic acid, wherein the copolymer content in total lies especially between 1 and 7 mol % especially between 1.5 and 5 mol %. Instead of the dicarboxylic acid its corresponding dimethylester can also be employed. As comonomers other linear, cyclic or aromatic diol and dicarboxylic acid compounds come into question. Typical comonomers are diethyleneglycol (DEG), isophthalic acid (IPA) or 1,4-bis-hydroxymethylcyclohexane (CHDM).

A special embodiment of the invention is provided in that the comonomer proportion of the diol component comprises mainly (more than 50%) of DEG.

The comonomer content corresponds to the sum of the diol comonomer content and of the dicarboxylic acid comonomer content.

The diol comonomer content is designated as the total number of moles of the diols.

The dicarboxylic acid comonomer content is designated as the number of dicarboxylic comonomers in relation to the total number of moles of dicaroxylic acids.

For the polyethyleneterephthalate it can involve a new material or a recyclate.

Additives can be put into the polyethyleneterephthalate. Suitable additives are e.g. catalysts, dyestuffs and pigments, TV-blockers, processing aids, stabilizers, shock-resistant modifiers, chemical and physical types of foaming agent, fillers like e.g. nucleation agents, barriers or particles with improved mechanical properties, strengthening bodies, like balls or fibers, as well as reactive substances like e.g. oxygen absorbers, acetaldehyde absorbers or molecular weight increasing substances and so forth.

Liquid Phase Polymerization

The polyester monomers are polymerized or polycondensed in a first step in the liquid phase to a prepolymer. Conventionally the manufacture of the prepolymer melt is carried out in a continuous process, wherein an esterification stage follows a prepolycondensation stage. In the conventional polyester manufacturing process a prepolycondensation stage follows in the high viscosity reactor (also referred to as Finisher). (Compare e.g. Modern Polyesters, Wiley Series in Polymer Science, Edited by John Scheirs, J. Wiley & Sons Ltd, 2003; Chapter 4.2). The polyester manufacture can also be carried out in a batch process (Compare e.g. Modern Polyesters, Wiley Series in Polymer Science, Edited by John Scheirs, J. Wiley & Sons Ltd, 2003; Chapter 4.1).

Preferably the degree of polymerization of the prepolymer lies between 55 and 100, especially between 65 and 80.

Alternatively, the polycondensation stage in the high viscosity reactor mentioned above can be omitted. Thereby a low viscosity polyester prepolymer comes into being with a degree of polymerization (DP), that lies significantly under the degree of polymerization of the polycondensate after the subsequent solid phase treatment. Usually the degree of polymerization of the low viscosity prepolymer lies under 60%, especially under 50% of the degree of polymerization of the post condensed polyester in the solid phase. Preferably the degree of polymerization of the low viscosity prepolymer lies between 10 and 50, especially between 15 and 35.

Another alternative is offered by the use of the already polycondensed polyethyleneterephthalates which are applied through melting or melting and depolymerizing to the suitable viscosity level.

The amounts of the diol components and the dicarboxylic acid components are chosen so that a prepolymer with an end-group ratio COOH:OH=2.1 to 1.5 especially 1:1 to 1:10 comes into being, wherein for the optimal end group ratio the conditions in the further manufacturing steps must be allowed for. So, for example, for prepolymers having a degree of polymerization under 35 the end-groups ratio COOH:OH=1.50 to 1.30 especially 1.10 to 1.25 are to be preferred.

For calculation of the degree of polymerization from the IV value of polyethyleneterephthalate, the relationship from U.S. Pat. No. 5,532,333, Stouffer et al is used $DP=155.5*IV^{1.466}$.

The IV value thereby specifies the solution viscosity and is determined according to the following procedure:

For measurement of the solution viscosity a mixture of phenol/dichlorobenzene (50.50 wt %) is used as solvent. The polymer sample is dissolved for 10 minutes at 130° C. at a concentration of 0.5% (0.5 g/dl). The measurement of the relative viscosity (R.V.) is carried out with an Ubbelohde viscosimeter (according to DIN Directive No. 53728, part 3 of January 1985).

The relative viscosity is the quotient of the solution viscosity and the viscosity of the pure solvent, which is comparable to the ratio of the corresponding capillary flow through rate. With the equation of Huggins the value of the intrinsic viscosity is calculated from the measured relative viscosity:

$$I.V. = \frac{\sqrt{1+4K_H(R.V.-1)}-1}{2*c*K_H}$$

With the above measurement methods (polymer concentration C=0.5 g/dl and the Huggins Constant KH=0.35) gives the equation:

$$I.V. = \frac{\sqrt{1+1.4(R.V.-1)}-1}{0.35} \ (dl/g)$$

The liquid phase polymerization conventionally takes place at elevated temperature, whereby the prepolymer is obtained as a prepolymer melt. The prepolymer melt can also however be produced by melting a previously solidified prepolymer. As prepolymer melts also mixtures of different polyethyleneterephthalate streams come into consideration, wherein recycled raw material can also be employed.

Granulation

In the granulation the prepolymer melts is converted into a defined shape and solidified. A process which is denoted as granulation.

In the granulation the polycondensate melt is pressed e.g. through a nozzle with an opening (hole) or a multiplicity of openings and cut or dropped.

The nozzle openings are customarily round, but can present another profile, such as e.g. slit-shaped openings. It is to be noted that to hold the product flow amounts per nozzle hole, in a narrow range in time and location, wherein the standard deviation of the individual flow amounts should be held between 0.1 and 10%. In order to achieve this according to the position of a nozzle hole its diameter or length are varied. At the same time to pay attention as closely as possible to uniform flow conditions (pressure, rate, temperature, viscosity and so forth) of the individual nozzle holes.

The cutting can be carried out at the nozzle exit or however only after traversing a treatment stretch.

The polycondensation melt is solidified by cooling. This can be carried out with the help of a liquid cooling medium, (e.g. water, ethyleneglycol) or a gaseous cooling medium (e.g. air, nitrogen, steam) or through contact with a cold surface, wherein combinations of cooling medium are conceivable.

The cooling can take place simultaneously as also as well as before or after the forming of particles takes place.

If a prepolymer melt is present from a conventional polyester manufacturing process, then granulation processes such as strand granulation, water ring granulation, under water granulation or head granulation (also hot face-granulation) is used.

A method for the manufacture of polyester granulates by dropping is described e.g. in Patent DE 10204954 that is involved with the present invention.

The average granulate size should lie between 0.2 mm and 3 mm, preferably between 0.5 mm and 2 mm and especially between 0.85 and 1 mm. As average granulate size the statistical average value of average granulate diameter is valid, which is given by the average from granulate height, length and width. The granulate size distribution should be held in a narrow spectrum. Preferably the standard deviation of the granulate weight of 100 measured granulates is between 2 and 20%.

The granulates should have a defined granulate shape, such as e.g. cylinder-shaped, spherically-shaped, drop-shaped, ball-like or a design shape, as suggested e.g. in EP 541 674, not however have an irregular granular product shape, such as results from a milling process or a breaking process. Preferably it involves a massive granulate that is: not a porous granulate, like is produced through sintering, foaming or the like.

Crystallization

Raising the degree of crystallization of the prepolymer granulates is carried out by conventionally continuous methods known from the state of the art. In accordance with the invention the crystallization should be carried out by a thermal means, whereby a thermally partially crystallized polyethyleneterephthalate results. Less suitable is solvent induced crystallization and crystallization by mechanical stretching.

The crystallization can take place as well during as also after the granulation step. For that the prepolymer granulate must be treated at a suitable crystallization temperature. In the crystallization at least a degree of crystallization should be achieved, which allows a treatment in the subsequent solid phase polycondensation, without formation of clumps or sticking together happening there.

The suitable temperature range is apparent if the crystallization half-time ($t_{1/2}$) time is recorded as a function of temperature. It is limited above and below through the temperature at which the crystallization half-time reaches about 10 times the minimal crystallization half-time. Since it is very hard to determine very short crystallization half-times ($t_{1/2}$), $t_{1/2}=1$ minute is employed as a minimal value.

For polyethyleneterephthalate the temperature range lies between 100 and 220° C. and a degree of crystallization of at least 20%, preferably at least 30% is reached.

If the temperature of the prepolymer granulates after the granulation step lies below the suitable crystallization temperature, the prepolymer granulates must be heated up. This can e.g. be carried out by means of a heated wall of the crystallization reactor, by heated components in the crystallization reactor, by means of radiation or by bubbling in a hot process gas.

The crystallization can be carried out from the vitreous state, that is after transitory cooling to a temperature below the crystallization temperature, especially below the glass transition temperature Tg.

Methods are also suitable, in which the crystallization takes place at least partially from the melt, wherein an increase in crystallinity during the cooling down phase and/or interrupted phase is carried out at higher temperature.

The suitable crystallization time follows from the time to be heated to the crystallization temperature plus at least the crystallization half-time at the given temperature, wherein preferably 2-20 half-times are chosen for the heat-up time, in order to achieve a sufficient mixing between crystalline and amorphous product.

In order to prevent sticking of the crystallizing prepolymer granulates these should be kept in motion relative to each other. This can e.g. be carried out by employment of an agitator, a moving container or by the action of a fluidizing gas.

Specially suitable crystallization reactors are fluid bed or fluidized bed crystallizers, since these do not tend to form dust.

Simultaneously with raising the degree of crystallization deposited residues of a liquid from the granulating process are removed.

If a process gas is used in the crystallization process circuit, then sufficient fresh gas or purified process gas must be added to this, in order to prevent excessive enrichment of the liquid. The process gases used in the solid phase polycondensation can also be employed in the crystallization step, wherein in the different process stages, different process gases can also be employed.

Solid Phase Polycondensation

The molecular weight of the polyethyleneterephthalates, especially the polyethyleneterephthalate granulates is brought to a higher degree of polymerization through a solid phase polycondensation. Conventionally the degree of polymerization after the solid phase polycondensation is more than 80, especially over 100. Usually the degree of polymerization after the solid phase polycondensation is less than 250, especially under 180. Polyethyleneterephthalates with higher degrees of polymerization are e.g. used for engineering fibers and preferably have a low comonomer content, e.g. <3.5 mol %, especially <2.5 mol %. For polyethyleneterephthalates for the manufacture of hollow bodies, such as e.g. bottles, the degree of polymerization after the solid phase polycondensation is usually under 150, preferably under 130, and the comonomer content usually lies above 3 mol %, preferably under 4 mol %.

In the case of a granulate from a low viscosity prepolymer melt the degree of polymerization is increased by at least 1.67 times, especially by at least 2 times that of the prepolymer.

The solid phase polycondensation is carried out according to methods known to the art and comprises at least the step of heating up to a suitable post condensation temperature and the post condensation reaction. Optionally other steps can take place prior to the crystallization or later cooling. In that connection continuous as well as batch processes come to be utilized, which e.g. take place in apparatuses like fluid bed, bubble bed, or solid bed reactors as well as in reactors with agitators or self-moving reactors, such as rotating pipe ovens or wobbling reactors. The solid phase polycondensation can take place at normal pressure, as well as at elevated pressure or under vacuum.

In the methods known to the state of the art, in which the step of heating up and the step of post condensation reaction takes place by means of the action of a process gas, the separation between the step of heat-up and the step of the postcondensation reaction it is given thereby that the heat-up step takes place with a high amount of gas (mg/mp=2–15 especially 2.5–10), whereby the temperature of the product essentially approaches the gas temperature, and the post condensation reaction step takes place with a lower amount of gas (mg/mp=0.1–1.4, especially 0.3–0.8) whereby the temperature of the gas essentially approaches the temperature of the product. Thereby mp is the sum of the masses of all the fed-in process product streams, and mg is the sum of all the fed-in gas streams. As process gas air or inert gases, like e.g. nitrogen or $CO_2$, as well as mixtures of process gases come into consideration. The process gas can contain additives, which either actively react with the product to be treated or are passive towards the product to be treated. The process gas is preferably at least partially fed into a flow loop. In order to prevent an adverse reaction of the polycondensation reaction, the process gas can be purified from undesired products, especially breakdown products of the polycondensation reactions. Split-off products like water, ethyleneglycol or aldehydes (e.g., acetaldehyde) should thereby be reduced to values under 100 pm, especially to values under 10 ppm. The purification can be carried out by means of state of the art gas purification systems like e.g. catalytic combustion systems, gas washers, adsorption systems or cold traps.

Especially the post condensation step usually takes place by means of a fresh or purified process gas. A variant provides that fresh or purified process gas is to be fed in at the start of the step of the postcondensation step. Another variant provides for, at least initially in the heat-up step, a fresh or at least partially purified process gas to be fed in.

A special embodiment of the invention provides that the postcondensation step takes place in a tubular reactor (solid bed reactor, moving bed reactor through which the polyethyleneterephthalate flows continuously from top to bottom, wherein the solid bed reactor has an L/D of more than 4 and a gas entry port in the upper third. From this gas entry port the process gas can flow either only to the top or in addition to the top can also flow to the bottom. The reactor can have another gas inlet at the bottom end, as well as a gas exit at the bottom end, or between the bottom and the top gas entry ports.

The suitable postcondensation temperature lies in a temperature range from 190° C. to 240° C., wherein temperatures under 220° C. are preferred.

The suitable postcondensation time lies in the range from 2-100 hours, wherein on economic grounds residence times of 6-30 hours are preferred.

Optionally the step of crystallization and the step of heat-up to a suitable postcondensation temperature can take place simultaneously or at least in the same reactor, wherein the reactor used for it can be divided into a plurality of process chambers in which different process conditions (e.g. temperature, and residence time) can prevail. It is advantageous thereby if the heat-up rate, at which the polycondensate is heated into the postcondensation temperature range, is sufficiently large so as to prevent excessive crystallization before the start of the polycondensation reaction. For PET the heat-up rate should be at least 10° C./min, preferably at least 50° C./min.

Special attention is demanded by the content of easily volatile carbonyl compounds like acetaldehyde or formaldehyde in the polyester after the solid phase polymerization. Values between 0 and 2 ppm, especially between 0 and 1 ppm are aimed for, wherein a polyethyleneterephthalate manufactured from a low viscosity prepolymer has particularly low values.

Product Manufacture

After completion of the solid phase polycondensation the polycondensates can be processed into different products such as fibers, bands, films or injection-molded parts.

PET is to a large extent processed into hollow bodies, e.g. such as bottles.

Characterization by DSC

For product characterization a partially crystalline polyethyleneterephthalate is used after the solid phase polycondensation.

Two different types of melting point can be determined by means of a DSC measurement:

1. The DSC melting point which results on the basis of treatment of the product is determined in the first run-through of a DSC measurement. The value provides information concerning the conditions, which must prevail in a melting process in order to process the polyester.
2. The DSC melting point, which results on the basis of the product structure (chemical composition, molecular weight, molecular weight distribution) is determined in the second run-through of a DSC measurement. The value serves on the one hand for the material characterization, but also provides information concerning the rheological properties of the polyester, which influence its processability.

For determination of the DSC melting points in the first run-through a heat-up of 10° C./min to 290° C. is carried out. After a holding time of 1 minute a cooling-down takes place at the maximal cooling rate. In the second run-through a heat-up is again carried out at 10° C./min to 290° C.

The DSC melting point corresponds to the temperature at which the endothermic melting peak has its maximum. The polyethyleneterephthalate should essentially have a single melting peak, wherein for a polyethyleneterephthalate with one double peak or side peak (also known as Schulter or concealed Schulter), which reaches more than 5% of the height of the main peak, the peak at the higher temperature is factored in. A Schulter or concealed Schulter is apparent through an additional significant stage or an additional maximum in the first derivative of the melting peak (compare FIGS. 1-3)

The enthalpy of melting corresponds to the area between the base-line and the melting peak, bounded by the left and right limits of the peaks, wherein a double peak or side peak is taken into account.

The enthalpy of melting in the first run-through of a polyethyleneterephthalate in accordance with the invention is preferably less than 70 J/g especially less than 65 J/g.

The DSC melting point of a polyethyleneterephthalate in accordance with the invention after the solid phase polycondensation in the first run-through and in the second run-through lies under a comonomer content dependant melting temperature (Tm) of a comparable standard polyethyleneterephthalate.

The comparable standard polyethyleneterephthalate thereby has a comparable degree of polymerization and is manufactured according to-day's mostly utilized large scale methods, comprising a polymerization in the liquid phase to a degree of polymerization of 65-80, followed by a granulation, wherein the polycondensate is cooled down with water as a cooling medium to under its glass transition temperature and granulates with a mass of 10-30 mg are produced, and a subsequent solid phase polycondensation.

The comonomer content dependant melting temperature (Tm) of a standard polyethyleneterephthalate is described e.g. in EP 532 988, wherein the data on comonomers is carried out. Calculated in mol % it is found that:

$$Tm = 261° C. - 2.31*mol\%DEG - 2.5*mol\%IPA - 3.42*mol\%CHDM.$$

Other literature citations proceed from a uniform melting point lowering independent of the type of comonomers (see S. Sakeilarides, ANTEC 96, p938ff).

From that results generally: Tm=TO−x*mol % comonomer.

The relationship from EP 532 988 gives from 1 to 8% comonomer content approximated with TO=262° C. and x=3. If CHDM is excluded, the approximation takes place through TD=261° C. and x=2.5° C.

By use of these approximations it is found for the polyethyleneterephthalate in accordance with the invention: Tm<260° C.−2.5*mol % comonomer content when above all IPA and DEG are taken into consideration or in general form Tm<260° C.−3*mol % comonomer content.

The DSC melting point in the second run-through of a polyethyleneterephthalate in accordance with the invention after the solid phase polycondensation is preferably smaller than the DSC melting point in the second run-through of its prepolymer before the solid phase polycondensation, wherein the difference is at least 2° C. especially at least 3° C.

EXAMPLES

Comparison Example 1

A polyethyleneterephthalate with a starting degree of polymerization of 77, with 2 mol % IPA ca. 2.5 mol % DEG comonomer content and an average granulate size of 2.5 mm was crystallized for 20 minutes at 175° C. and cooled down, then subsequently reheated to 215° C. over a period of 60 minutes, treated for 8 hours at 215° C. under nitrogen and cooled rapidly.

DSC melting points were measured of 254° C. in the first run-through and 250° C. in the second run-through, which essentially corresponds to the calculated melting point of 249.75° C. and in the first run-through indicates the typical displacement through the SSP treatment (compare FIGS. 4a and 4b).

Example 1

A polyethyleneterephthalate with an initial polymerization degree of 25, with 2 mol % IPA, ca. 2.5 mol % DEG comonomer content and an average granulate size of 0.4 mm was cooled from the melt to 170° C., crystallized for 2 hours at 170° C. and cooled down, and subsequently heated up to 215° C. at 2° C./minute, treated for 15 hours at 215° C. under nitrogen and rapidly cooled.

DSC melting points of 244° C. in the first run-through and 241° C. in the second run-through were measured, which lies significantly under the calculated melting point of 249.75° C. (compare FIGS. 5a and 5b).

Example 2

A polyethyleneterephthalate with an initial degree of polymerization of 25, with 2 mol % IPA ca. 2.5 mol % DEG comonomer content and an average granulate size of 0.4 mm was cooled down from the melt to 170° C., crystallized for 10 seconds at 170° C. and cooled down, subsequently heated up to 215° C. at 100° C./minute, treated for 15 hours at 215° C. under nitrogen and rapidly cooled.

DSC melting points of 245° C. were measured in the first run-through and 241° C. in the second run-through, which lies clearly under the calculated melting point of 249.75° C. (compare FIGS. 6a and 6b).

FIGURES

FIGS. 1 through 3 show the course of the melting peaks in the DSC as a function of the treatment time in a solid phase polycondensation at 215° C. for a polyethyleneterephthalate with an initial degree of polymerization of 53, with 2 mol % IPA, ca. 2.5 mol % DEG comonomer content. From that the interpretation of the side peaks is apparent by means of the first derivative. The results are summarized in Table 1.

FIG. 1a shows the first run-through inclusive of the first derivative of the sample after 4 hours treatment time. A clearer Schulter peak (T=248.1° C.) is recognizable.

FIG. 1b shows the second run-through of the sample after 4 hours treatment time.

FIG. 2b shows the second run-through of the sample after 12 hours treatment time.

Figure 4B:
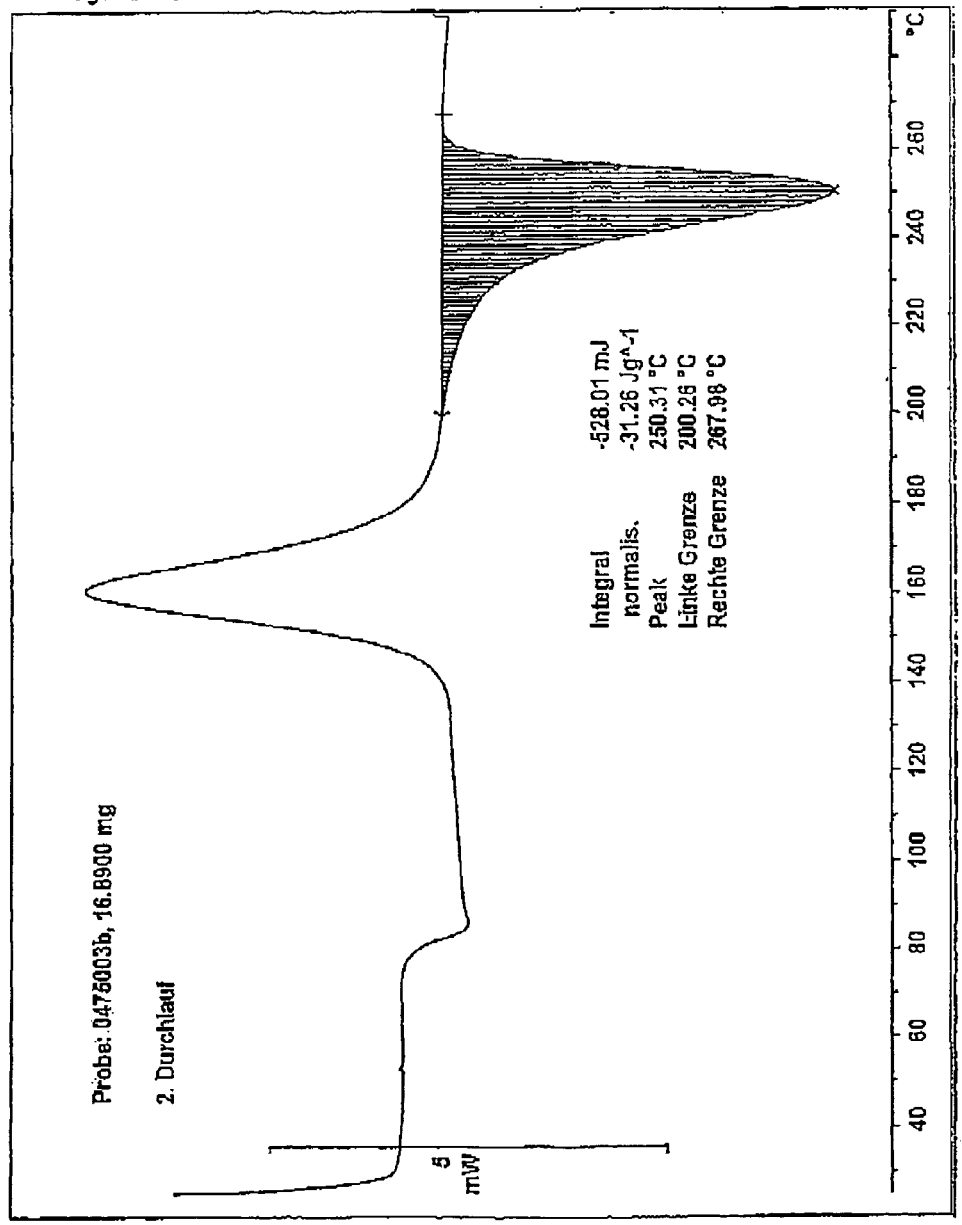

FIG. 4a shows a DSC curve for the Comparison Example 1 at the first run-through inclusive of the first derivative of the sample. In the derivative, a step (~254° C.) is visible after the main peak (249.0° C.). FIG. 4b shows a DSC curve for the Comparison Example 1 at the second run-through of the sample.

FIG. 5a shows a DSC curve for Example 1 at the first run-through inclusive of the first derivative of the sample. In the derivative, a step (~244° C.) is visible immediately after the main peak (242.7° C.). FIG. 5b shows a DSC curve for Example 1 at the second run-through of the sample.

FIG. 6a shows a DSC curve for Example 2 at the first run-through inclusive of the first derivative of the sample. In the derivative, no steps are visible but only the main peak (244.6° C.). FIG. 6b shows a DSC curve for Example 2 at the second run-through of the sample.

TABLE 1

Figure 2A:
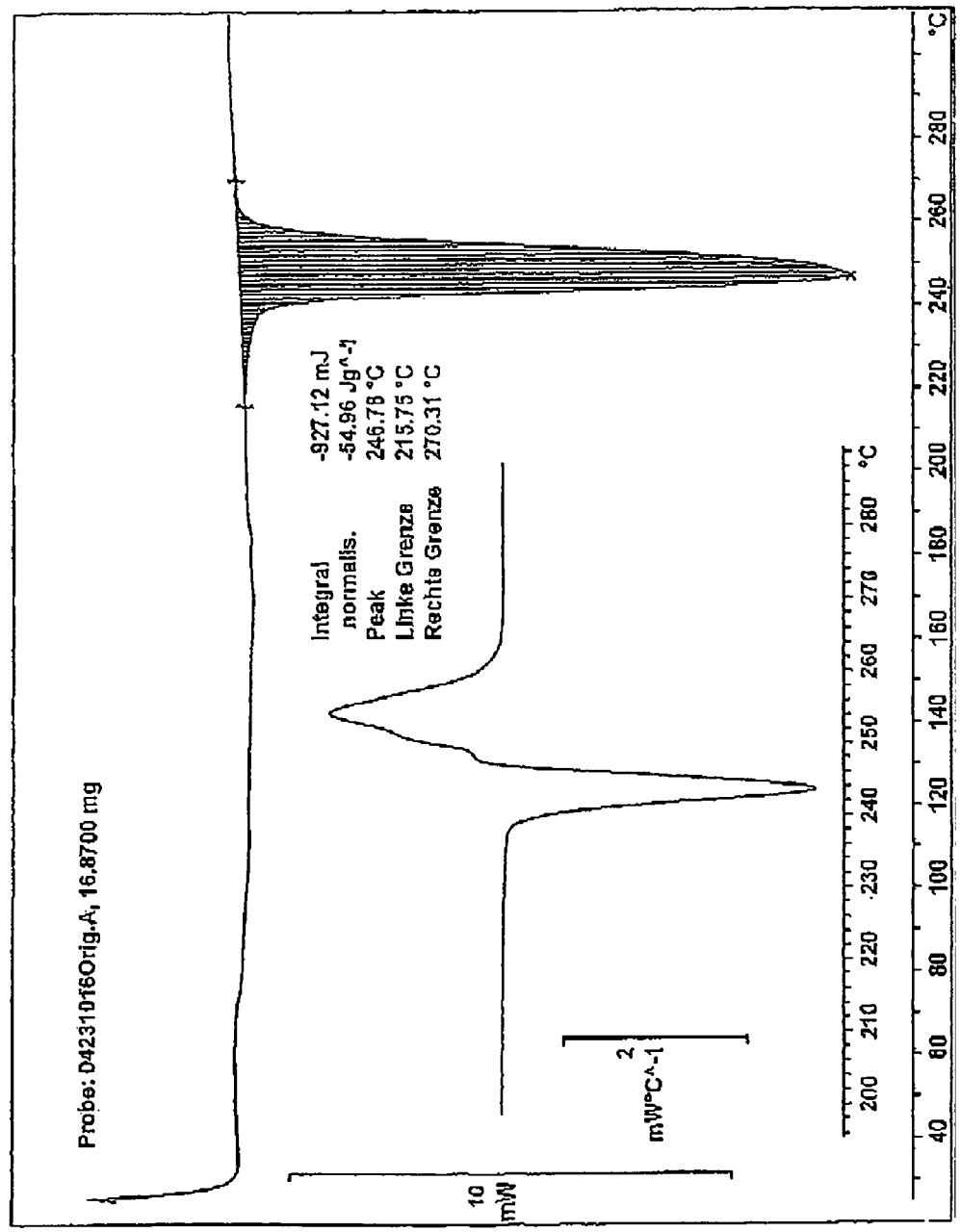
FIG. 2a shows the first run-through inclusive of the first derivative of the sample after 12 hours treatment time. In the derivative a step (~249.2° C.) is visible immediately after the main peak.
Figure 3A:
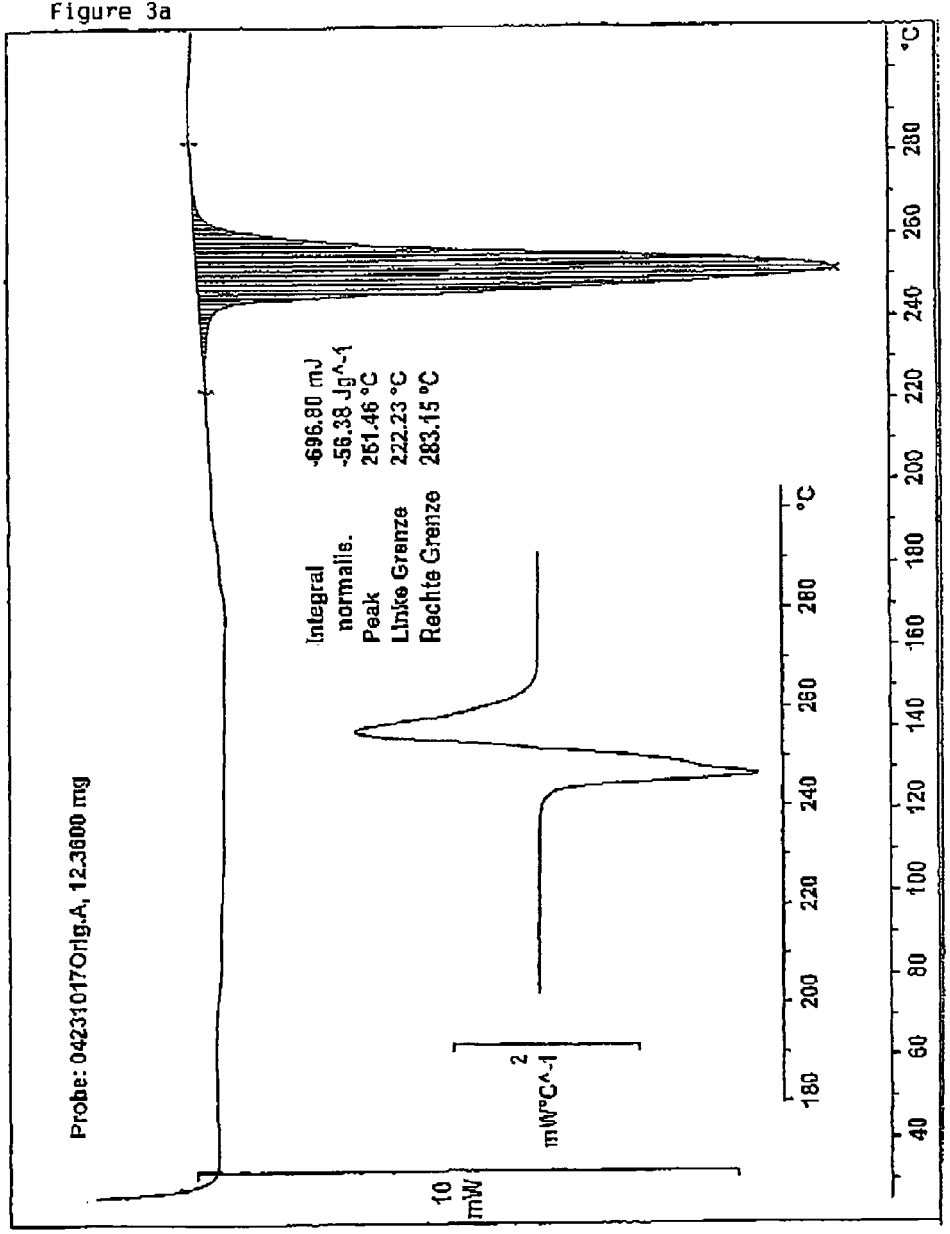
FIG. 3a shows the first run-through inclusive of the first derivative of the sample after 28 hours treatment time. In the derivative no step (T =251.5° C.) is discernible immediately after the main peak.
Figure 3B:
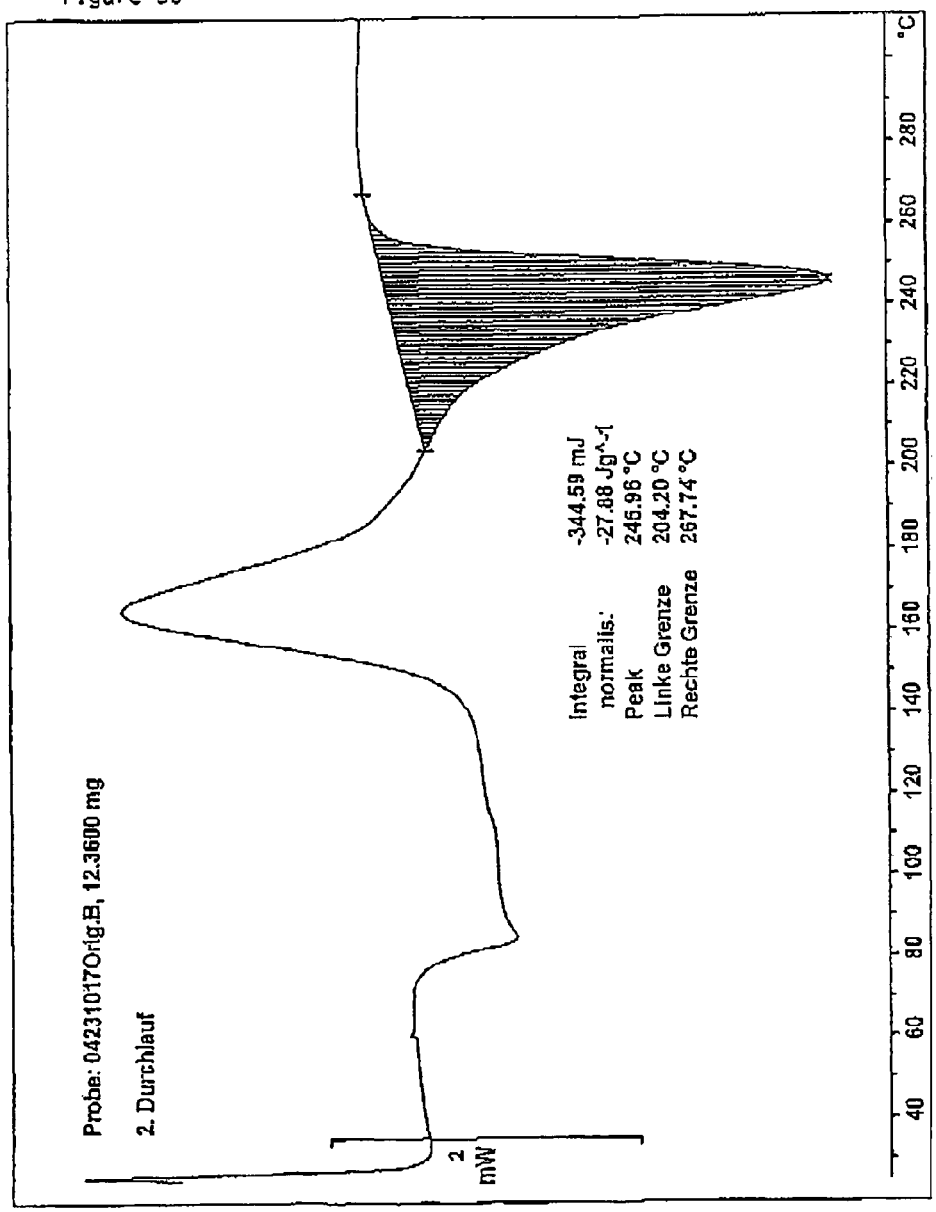
FIG. 3b shows the second run-through of the sample after 28 hours treatment time.

| DSC Scan | FIG. 1a | FIG. 2a | FIG. 3a |
|---|---|---|---|
| treatment time | 4 hours | 12 hours | 28 hours |
| Degree of polymerization | 95 | 152 | 220 |
| DSC 1 run | | | |
| melting peak 1 | 240.9° C. | 246.8° C. | 251.5° C. |
| height | 9.2 mW | 13.9 mW | 11.9 mW |
| melting peak 2 | 248.1° C. | 249.2° C. | |
| height | 6.0 mW (65%) | 13 mW (94%) | |
| DSC 2 run | | | |
| melting peak 1 | 248.3° C. | 248.6° C. | 246.0° C. |
| valid DSC melting temperature | | | |
| 1. run-through | 248.1° C. | 249.2° C. | 251.5° C. |
| 2. run-through | 248.3° C. | 248.6° C. | 246.0° C. |

The invention claimed is:

1. Partially crystalline polyethyleneterephthalate having a degree of polymerization larger than 80 manufactured from
   (a) diol component which comprises up to 95 mol % to 100 mol % of ethylene glycol, and
   (b) a dicarboxylic acid component which up to 95 mol % to 100 mol % comprises terephthalic acid,
   wherein a total comonomer content of said polyethyleneterephthalate lies between 1 and 7%, and
   wherein in a first step the diol component and dicarboxylic acid component are brought together in a liquid phase to obtain a low viscosity prepolymer having a degree of polymerization between 10 and 50,
   said prepolymer is thereafter granulated into granules having an average granule size between 0.2 and 3 mm, and the granules subjected to a solid phase polycondensation at a temperature below 220° C. for from 6 to 30 hours to obtain a polyethyleneterephthalate, wherein a DSC melting point of said polyethyleneterephthalate measured at a heat-up rate of 10° C./min in a first run-through and in a second run-through, lies below a comonomer dependent melting temperature (Tm) of a polyethyleneterephthalate having been prepared via a solid state polycondensation from a prepolymer having a degree of polymerization between 65 and 80 which was formed into granulate having a mass of 10 to 30 mg and which was cooled with water below its glass transition temperature, as calculated with the equation T0–2.5° C.*% comonomer content (in mol %) with T0 being equal to 260° C., wherein a comonomer proportion of the diol component is comprised mainly of diethyleneglycol, or as calculated with the equation T0–3.0° C.*% comonomer content (in mol %) with T0 being equal to 260° C.

2. Polyethyleneterephthalate in accordance with claim 1 manufactured from a diol component, which comprises up to 97 mol % to 99 mol % of ethylene glycol, and a dicarboxylic acid component, which up to 97 mol % to 100 mol % comprises terephthalic acid, wherein the total comonomer content lies between 1.5 and 5%.

3. Polyethyleneterephthalate in accordance with claim 2, wherein the DSC melting point in the first run-through and in the second run-through lies under 245° C.

4. Polyethyleneterephthalate in accordance with claim 1 wherein the DSC melting point in the first run-through is larger than the DSC melting point in the second run-through.

5. A partially crystalline polyethyleneterephthalate in accordance with claim 1 having a thermally partially crystallized polyethyleneterephthalate therein.

6. A polyethyleneterephthalate in accordance with claim 1 having a linear polyethyleneterephthalate therein.

7. The polyethyleneterephthalate in accordance with claim 1 wherein the polyethyleneterephthalate has a DSC enthalpy of melting in the first run-through smaller than 65 J/g.

8. The polyethyleneterephthalate in accordance with claim 1 wherein the polyethyleneterephthalate exists as granulate and the average granulate size lies between 0.8 and 1.4 mm.

9. The polyethyleneterephthalate in accordance with claim 8, wherein the granulate comprises massive particles, which have a defined shape selected from one of cylinder-shaped, spherically-shaped, ball-shaped, drop-shaped and ball-like.

10. The polyethyleneterephthalate in accordance with claim 1 wherein the degree of polymerization of the partially crystalline polyethyleneterephthalate lies between 145 and 180 and the comonomer content amounts to less than 3.5 mol %.

11. The polyethyleneterephthalate in accordance with claim 1 wherein the degree of polymerization of the partially crystalline polyethyleneterephthalate lies between 100 and 130.

* * * * *